United States Patent
Lepo et al.

(10) Patent No.: US 10,640,926 B2
(45) Date of Patent: May 5, 2020

(54) CORE/SHELL POLYMER PARTICLES AS SURFACE SIZING AGENTS

(71) Applicant: Kemira Oyj, Helsinki (FI)

(72) Inventors: Anneli Lepo, Tampere (FI); Elsi Turunen, Espoo (FI); Tarja Turkki, Helsinki (FI); Bernhard Überbacher, Krems (AT)

(73) Assignee: KEMIRA OYJ, Helsinki (FI)

( * ) Notice: Subject to any disclaimer, the term of this patent is extended or adjusted under 35 U.S.C. 154(b) by 77 days.

(21) Appl. No.: 15/756,900

(22) PCT Filed: Sep. 2, 2016

(86) PCT No.: PCT/FI2016/050610
§ 371 (c)(1),
(2) Date: Mar. 1, 2018

(87) PCT Pub. No.: WO2017/037347
PCT Pub. Date: Mar. 9, 2017

(65) Prior Publication Data
US 2018/0251945 A1    Sep. 6, 2018

(30) Foreign Application Priority Data

Sep. 4, 2015   (FI) .................................. 20155638

(51) Int. Cl.
 *D21H 23/22*   (2006.01)
 *D21H 21/54*   (2006.01)
 (Continued)

(52) U.S. Cl.
 CPC ........... *D21H 23/22* (2013.01); *C08F 212/08* (2013.01); *C08F 220/18* (2013.01);
 (Continued)

(58) Field of Classification Search
 None
 See application file for complete search history.

(56) References Cited

U.S. PATENT DOCUMENTS 3,847,856 A    11/1974  Mueller et al.
4,427,836 A     1/1984  Kowalski et al.
(Continued)

FOREIGN PATENT DOCUMENTS

CN    101768895 A    7/2010
CN    105037632 A   11/2015
(Continued)

OTHER PUBLICATIONS

"Thermal Transitions of Homopolymer: Glass Transition & Melting Point", Reference Polymer Properties, https://www3.nd.edu/~hgao/thermal_transitions_of_homopolymers.pdf, Retrieved: Mar. 22, 2016, pp. 52-53.
(Continued)

*Primary Examiner* — Dennis R Cordray
(74) *Attorney, Agent, or Firm* — Birch, Stewart, Kolasch & Birch, LLP

(57) ABSTRACT

The present invention provides a core/shell polymer particle for surface sizing of cellulosic products, wherein the core polymer and the shell polymer of the core/shell polymer particle are polymerized from monomers comprising at least 40%, by weight of monomers selected from branched C3-10-alkyl (meth)acrylate, styrene, linear C1-10-alkyl (meth)acrylate, and acrylonitrile, based on the total weight of the monomers of the core/shell polymer particle; provided that the polymer of the core/shell polymer particle comprises at least 40% by weight of branched C3-6-alkyl (meth)acrylate and at least 50% by combined weight of branched C3-10-alkyl (meth)acrylate and styrene, linear C1-10-alkyl
(Continued)

(meth)acrylate, and/or acrylonitrile, based on the total weight of the monomers of the core/shell polymer particle.

21 Claims, 2 Drawing Sheets

(51) Int. Cl.
*D21H 21/16* (2006.01)
*D21H 19/22* (2006.01)
*D21H 17/20* (2006.01)
*C08F 220/18* (2006.01)
*C08F 212/08* (2006.01)
*C08L 3/02* (2006.01)
*C08L 1/02* (2006.01)
*C09D 133/08* (2006.01)
*C08F 251/00* (2006.01)
*C08F 285/00* (2006.01)
*C08F 265/06* (2006.01)

(52) U.S. Cl.
CPC .......... *C08F 251/00* (2013.01); *C08F 265/06* (2013.01); *C08F 285/00* (2013.01); *C08L 1/02* (2013.01); *C08L 3/02* (2013.01); *C09D 133/08* (2013.01); *D21H 17/20* (2013.01); *D21H 19/22* (2013.01); *D21H 21/16* (2013.01); *D21H 21/54* (2013.01); *C08L 2207/53* (2013.01)

(56) References Cited

U.S. PATENT DOCUMENTS

| | | | |
|---|---|---|---|
| 6,087,457 A * | 7/2000 | Tsai | D21H 21/16 162/135ke |
| 6,800,675 B1 | 10/2004 | Pfalz et al. | |
| 2001/0016612 A1 | 8/2001 | Kasai | |
| 2007/0218291 A1 | 9/2007 | Chiou et al. | |
| 2008/0268251 A1 | 10/2008 | Kang et al. | |
| 2011/0306727 A1 * | 12/2011 | Grablowitz | C08F 265/06 524/710 |

FOREIGN PATENT DOCUMENTS

JP      2010-90178 A      4/2010
WO      WO 97/37078 A1   10/1997

OTHER PUBLICATIONS

Finnish Search Report for FI 20155638, dated Mar. 24, 2016.
International Preliminary Report on Patentability issued in PCT/FI2016/050610 (PCT/IPEA/409), dated Dec. 21, 2017.
International Search Report issued in PCT/FI2016/050610 (PCT/ISA/210), dated Nov. 30, 2016.
Written Opinion of the International Searching Authority issued in PCT/FI2016/050610 (PCT/ISA/237), dated Nov. 30, 2016.
Extended European Search Report dated May 8, 2019 in corresponding European Application No. 16840886.2.
Shanshan Hu, et al., "GIUSAXS and AFM Studies on Surface Reconstruction of Latex Thin Films during Thermal Treatment", Langmuir, vol. 25, No. 7, Apr. 7, 2009, XP055578710, pp. 4230-4234.
Finnish Office Action dated Aug. 15, 2019, for corresponding Finnish Application No. 20155638.
Finnish Office Action dated Dec. 8, 2016 for corresponding Finnish Application No. 20155638.

* cited by examiner

CORE/SHELL POLYMER PARTICLES AS SURFACE SIZING AGENTS

FIELD OF THE INVENTION

The present invention relates to surface sizing of cellulosic products, such as paper, and in particular to a core-shell polymer particles suitable for surface sizing.

BACKGROUND OF THE INVENTION

Sizing is a technique which is typically used to control absorption and/or penetration of paper and other cellulosic products by fluids such as water, water-borne compositions, and inks. Paper and other cellulosic products may be sized to a variety of degrees and for a variety of purposes.

Sizing can be carried out before cellulosic product is completely formed by adding an internal sizing agent directly to aqueous pulp slurry to coat the fibers of the pulp or after formation of the finished cellulosic products by applying sizing agents to at least one surface of the product thus filling the capillaries of the product. Surface sizing is generally less expensive than internal sizing, as almost the entire sizing agent is retained on the surface of the treated product.

Many different materials have been employed commercially as surface sizes including synthetic products based on styrene-maleic anhydride (SMA) copolymers and naturally occurring materials such as wax and as internal sizes such as alkenyl succinic anhydride, alkyl ketene dimer or rosin. While there are a variety of known surface sizing systems, a continual need exists for sizing systems that provide improved sizing performance (e.g. lower water absorptiveness as determined by the Cobb method) over known sizing systems.

BRIEF DESCRIPTION OF THE INVENTION

It is thus an object of the present invention to provide a polymer for surface sizing so as to alleviate the disadvantages of the known sizing systems. The objects of the invention are achieved by core-shell polymer particles, a surface sizing agent comprising the same and methods for use thereof which are characterized by what is stated in the independent claims. The preferred embodiments of the invention are disclosed in the dependent claims.

The invention is based on the realization that polymer particles having a core-shell structuring with a specific formulation have a sizing efficiency better than polymer particles containing the same monomers in a random polymer structure. The polymer composition of the present core-shell polymer particles may be made with an emulsifier-free polymerization.

BRIEF DESCRIPTION OF THE DRAWINGS

In the following the invention will be described in greater detail by means of preferred embodiments with reference to the drawings, in which.

DETAILED DESCRIPTION OF THE INVENTION

Figure 1:
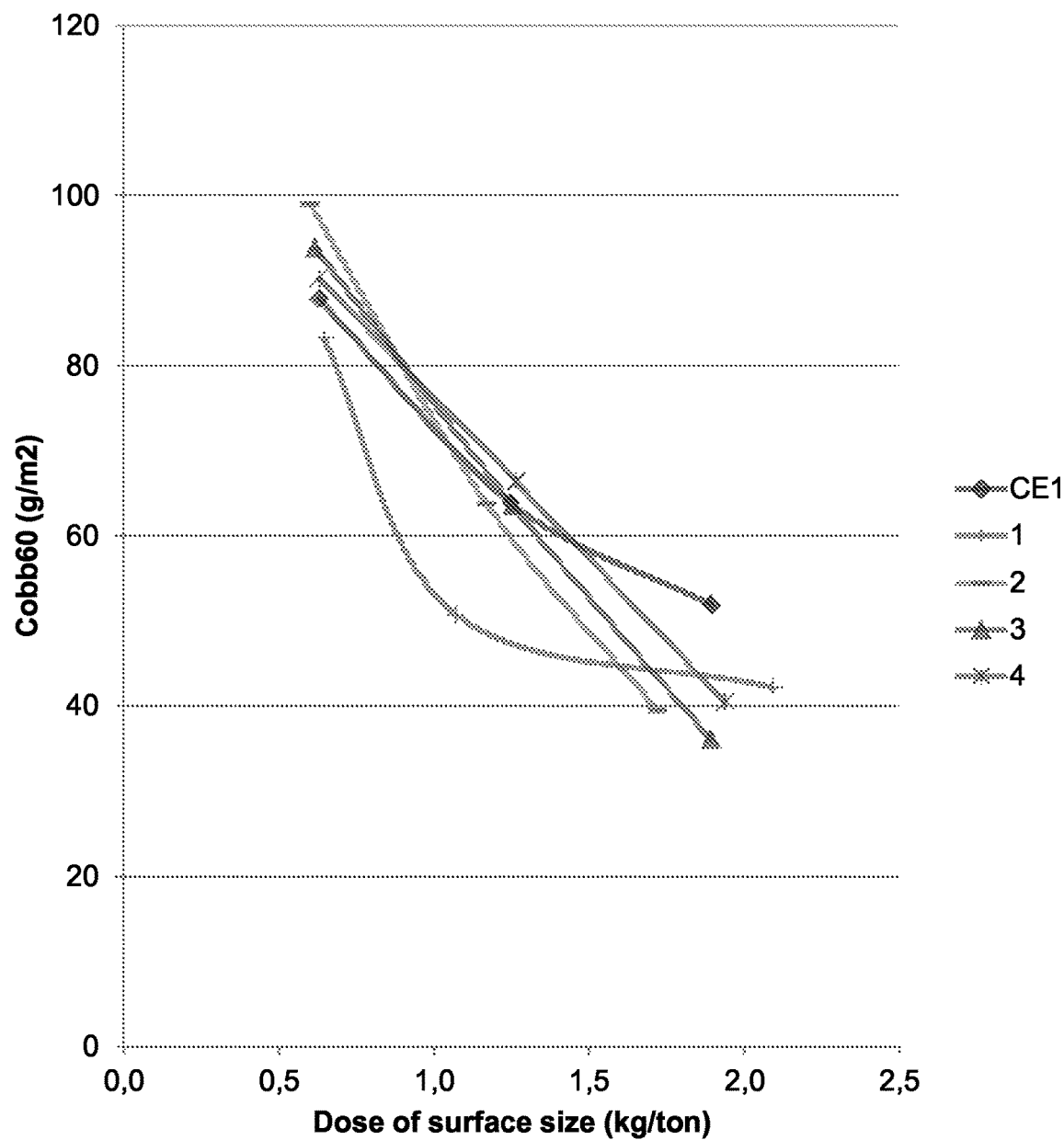
FIG. 1 shows water absorptiveness of paper surface sized with first batch of different sizing compositions.

The present invention provides core-shell polymer particles for surface sizing of paper and other cellulosic products, wherein the core polymer and the shell polymer of the core/shell polymer particle are polymerized from monomers comprising at least 40%, preferably at least 50%, by weight of monomers selected from branched $C_{3-10}$-alkyl (meth) acrylate, such as tert-butyl acrylate (t-BA), styrene, linear $C_{1-10}$-alkyl (meth)acrylate, such as n-butyl acrylate (n-BA), and acrylonitrile (ACN), based on the total weight of the monomers of the core/shell polymer particle;

provided that the polymer of the core/shell polymer particle comprises at least 40%, preferably at least 50%, by weight of branched $C_{3-6}$-alkyl (meth)acrylate and at least 50%, preferably at least 60%, even more preferably at least 70%, by combined weight of branched $C_{3-10}$-alkyl (meth) acrylate and styrene, linear $C_{1-10}$-alkyl (meth)acrylate, and/ or acrylonitrile, based on the total weight of the monomers of the core/shell polymer particle.

Preferably the core polymer and the shell polymer of the core/shell polymer particles are polymerized from monomers selected from branched $C_{3-6}$-alkyl (meth)acrylate, such as tert-butyl acrylate and/or tert-butyl methacrylate, styrene, linear $C_{3-6}$-alkyl acrylate, such as n-butyl acrylate, and acrylonitrile; more preferably from monomers selected from tert-butyl acrylate, n-butyl acrylate, and acrylonitrile.

When monomer ratio of the branched $C_{3-10}$-alkyl (meth) acrylate is reduced below 40% by weight the hydrophobation performance of the polymer is significantly reduced.

As compared to particle composition of random polymer particles the core-shell structuring of the provided polymer particles provides improved sizing performance. With the core-shell structuring it is possible also to replace some of the expensive branched $C_{3-10}$-alkyl (meth)acrylate with one or more monomer(s) selected from of styrene, linear $C_{1-10}$-alkyl (meth)acrylate, such as n-butyl acrylate, and acrylonitrile, and still maintain the sizing efficiency. In addition, it has been discovered that the best results are obtained when the branched $C_{3-10}$-alkyl (meth)acrylate, in particular tert-butyl acrylate and/or tert-butyl methacrylate, is located in the shell of the polymer particle.

In an example of the present invention the core/shell polymer particle comprises (a) a core polymer polymerized from monomers comprising at least 25% by weight, of monomers selected from branched $C_{3-10}$-alkyl (meth)acrylate, such as tert-butyl acrylate and/or tert-butyl methacrylate, styrene, linear $C_{1-10}$-alkyl (meth)acrylate, such as n-butyl acrylate, and acrylonitrile; and (b) a shell polymer polymerized from monomers comprising at least 25%, more preferably at least 30%, even more preferably at least 50%, by weight, of branched $C_{3-10}$-alkyl (meth)acrylate, based on total weight of the monomers of the core/shell polymer particle, and wherein the shell polymer preferably encapsulates the core polymer.

Preferably the core/shell polymer particle comprises at least 50% by weight branched $C_{3-10}$-alkyl (meth)acrylate and at least 75% by combined weight of branched $C_{3-10}$-alkyl (meth)acrylate and acrylonitrile, based on the total weight of the monomers of the core/shell polymer particle. In particular the core/shell polymer comprises at least 60%, more preferably at least 75%, by weight, of branched $C_{3-10}$-alkyl (meth)acrylate, preferably branched $C_{3-6}$-alkyl (meth)acrylate, in particular tert-butyl acrylate and/or tert-butyl methacrylate, based on the total weight of the monomers of the core/shell polymer particle.

The best sizing performance is obtained when shell of the core/shell polymer particle, i.e. the shell polymer, comprises at least 50%, preferably at least 60%, more preferably at least 75%, by weight, of branched $C_{3-10}$-alkyl (meth)acrylate, preferably branched $C_{3-6}$-alkyl (meth)acrylate, in particular tert-butyl acrylate and/or tert-butyl methacrylate. based on the total weight of the shell polymer monomers.

The core of the core/shell polymer particle, i.e. the core polymer, preferably comprises 50% to 100%, more preferably 80 to 100%, by weight, of monomers selected from branched $C_{3-10}$-alkyl (meth)acrylate, such as tert-butyl acrylate and/or tert-butyl methacrylate, styrene, linear $C_{1-10}$-alkyl (meth)acrylate, such as n-butyl acrylate, and acrylonitrile, and any mixtures thereof, based on the total weight of the core polymer monomers. Presence of acrylonitrile allows lower monomer ratio of the branched $C_{3-10}$-alkyl (meth)acrylate than the presence of linear $C_{1-10}$-alkyl (meth)acrylates, although a portion of branched $C_{3-10}$-alkyl (meth)acrylates can be replaced by of linear $C_{1-10}$-alkyl (meth)acrylates without significant change in the sizing efficiency.

The monomers of the core/shell polymer particle can be provided in different combinations provided that polymer particles having a "core-shell" type construct are obtained. Thus the monomer composition can be altered as a gradient or in sequences, preferably in sequence.

Ratio of the weight of the core polymer monomers to the weight of the shell polymer monomers is preferably from 75:25 to 25:75. With styrene-free core-shell polymers, a thicker shell, in particular a thicker tert-butyl acrylate shell, improves the sizing performance. For optimal performance the shell polymer has a glass transition temperature from 35 to 75° C., more preferably from 40 to 65° C. Further, for optimal performance the core polymer has a glass transition temperature below 75° C., preferably below 65° C.

In a particularly advantageous example of the present core/shell polymer particle, the branched $C_{3-10}$-alkyl (meth)acrylate monomer is branched $C_{3-6}$-alkyl (meth)acrylate, such as such as tert-butyl acrylate and/or tert-butyl methacrylate, more preferably branched $C_{3-6}$-alkyl (meth)acrylate, most preferably tert-butyl acrylate.

The core polymer and the shell polymer of the core/shell polymer particle are typically polymerized from monomers in presence of degraded starch or water-soluble natural or synthetic polymer. The degraded starch typically has molecular weight $M_n$ of 500 to 10000. The monomers are preferably dispersion polymerized, such as suspension polymerized or emulsion polymerized, to form the desired core/shell polymer particle. Preferably the core/shell polymer particles are obtained by a radically initiated dispersion polymerization in presence of degraded starch, and/or water-soluble natural or synthetic polymer, preferably degraded starch. The term "total weight of the monomers of the core/shell polymer particle" refers thus only to the amount of the polymerizable monomers and excludes the amount of degraded starch and water-soluble natural or synthetic polymer in the composition. Typically the amount of degraded starch and/or water-soluble natural or synthetic polymer varies from 10 to 60%, preferably 15 to 40%, per weight of the weight of the total solids content of the core/shell polymer particles i.e. the sum of monomers and degraded starch and water-soluble natural or synthetic polymer is 100%. Polymerization of the monomers is preferably preformed in the absence of low molecular weight emulsifiers, in particularly those selected from sodium alkanesulfonate, sodiumdodecylsulfate, sodium dodecylbenzenesulfonate, sulfosuccinic esters, fatty alcohol polyglycol ethers, alkylaryl polyglycol ethers and the like.

The methods for core/shell polymerization are generally known to a person skilled in the art. Preparation of the core/shell polymer particles may be done for example by dispersing degraded potato starch in heated water and then feeding desired monomers in two steps: first core monomer(s) and then shell monomer(s) with a simultaneous feed of hydrogen peroxide. After cooling and quenching the reaction, filtration provides a finely divided dispersion comprising desired core/shell polymer particles.

The polymerization may be performed in the presence of a graft-linking water-soluble redox system to initiate polymerization. Suitable systems include redox systems comprising hydrogen peroxide and heavy metal ions such as cerium, manganese or iron(II) salts.

The particle size distribution D50 of the core/shell polymer particles is preferably below 110 nm.

Further provided herein is a surface sizing composition comprising core-shell polymer particles as defined herein. The surface sizing composition is typically provided in an aqueous liquid vehicle, as an aqueous solution or dispersion, although small amounts of water-soluble or water miscible organic solvent(s) may also be present. The surface sizing composition solution typically includes, along with the sizing compounds, starch, which can be anionic, non-ionic, amphoteric, or cationic, preferably anionic starch. The starch concentration is preferably from 1% to 30%, more preferably from 5 to 25% and the sizing agent, i.e. the core-shell polymer particle, concentration is from 0.1 to 20% by weight, preferably 0.5 to 5.0% by weight, based on the weight of dry starch.

The specific techniques used to size paper and other cellulosic products such as cardboard, include, but are not limited to, those techniques that are commonly employed in papermaking to apply the sizing composition to the cellulose-based product. For instance, the aqueous sizing composition may be applied to the surface of the paper using a puddle or film size press or a size press by using a calender or a doctor knife blade. Alternatively, the sizing composition may be sprayed onto the paper web or be applied by dipping the paper into the aqueous surface sizing composition. Paper or other cellulosic product treated with the surface sizing solution is then dried at elevated temperatures, typically temperature of the paper is from 80 to 110° C. Drying the paper web is sufficient to bring the surface size and surface strength to full development.

The sizing composition disclosed herein also may be used in conjunction with or serially with other additives conventionally used in the production of paper and other cellulosic products. Such additional additives commonly known in the art include, but are not limited to, colorants, inorganic pigments and fillers, anti-curl agents, additional conventional components such as surfactants, plasticizers, humectants, defoamers, UV absorbers, light fastness enhancers, polymeric dispersants, dye mordants, optical brighteners, and leveling agents.

The present invention further provides a method of surface sizing a cellulosic product, in particular paper, comprising applying to at least one surface of the cellulosic product a sizing composition comprising core-shell polymer particles as defined herein. Further accordingly provided herein is a paper surface-sized with core-shell polymer particles as defined herein or a surface sizing composition as defined herein.

The paper or other cellulosic product onto which the surface sizing composition is applied may vary widely and is independent of the kind of pulp used to make the paper. The surface sizing compositions disclosed herein are suitable for the preparation of sized paper of any thickness and of any kind and thus applicable to papers or cardboards obtained from any specific paper pulp and mixtures thereof.

The paper or other cellulosic product also may contain additives such as fillers, dyestuffs, paper strengthening agents, drainage rate improvers, and internal sizing agents.

Water absorptiveness of paper surface sized with the present surface size composition can be determined using the Cobb 60 method, ISO 535:1991(E), at 23° C., 50% relative humidity

EXAMPLES

Example 1

57.25 g of an oxidatively degraded potato starch (Perfectamyl A 4692) was dispersed with stirring in 329 g of demineralizer water in a 1 L glass reactor with a cooling/heating jacket under a nitrogen atmosphere. The starch was dissolved by heating the mixture to 85° C. and cooking at 85° C. for 30 minutes. After starch dissolution was complete, 28.6 g of 0.66% strength aqueous solution of ferrous (II) sulfate heptahydrate was added in to the reactor. After 10 minutes 3.3 g of 30% strength hydrogen peroxide was added. After 10 minutes, the starch degradation was complete. Then 167.4 g of heated demineralizer water was added to the reactor. After the temperature had stabilized to 85° C., the chemical feeds were started. Monomers were fed in two steps: 83.7 g of mixture of n-butyl acrylate and acrylonitrile (1:1 weight) was fed first during 60 minutes. Then 83.7 g of tert-butyl acrylate was fed during 60 minutes. 48.8 g of 10% solution of hydrogen peroxide was fed simultaneously with the monomer feeds during 120 min. The reactor temperature was kept at 85° C. during the feeds and 15 minutes after for postpolymerization. Then the mixture was cooled to 60° C. and 5.2 g of 11.7% strength tert-butyl hydroperoxide solution was added dropwise into the reactor. The temperature was kept at 60° C. for further 60 min. Thereafter, cooling was effected to 40° C. and 5.9 g of 10% strength ethylenediaminetetraacetic acid sodium salt (EDTA-Na) solution was added, followed by pH adjustment to 6 with 25% strength sodium hydroxide solution and cooling to room temperature. Filtration was performed using a 100 µm filter cloth. A finely divided dispersion with a solid content of 26.5% is obtained.

Example 2

Example 1 was repeated with 83.7 g of a mixture of n-butyl acrylate and styrene (1:1 weight) in the first monomer feed and 83.7 g of tert-butyl acrylate in the second monomer feed. The first feed was fed in 60 minutes and the second in 60 minutes. A finely divided dispersion with a solid content of 26.7% is obtained.

Example 3

Example 1 was repeated with 41.9 g of n-butyl acrylate in the first monomer feed and 125.6 g of tert-butyl acrylate in the second monomer feed. The first feed was fed in 30 minutes and the second in 90 minutes. A finely divided dispersion with a solid content of 26.7% is obtained.

Example 4

Example 1 was repeated with 41.9 g of n-butyl acrylate in the first monomer feed and 125.6 g of tert-butyl acrylate in the second monomer feed. Half of the first feed was fed in 15 minutes and the second half in 45 minutes. The second feed was started 15 minutes after the first feed. ⅓ of the second feed was fed in 45 minutes simultaneously with the first monomer feed. After this ⅔ of the second monomer feed was fed in 60 minutes. A finely divided dispersion with a solid content of 26.8% is obtained.

Example 5

60.6 g of an oxidatively degraded potato starch (Perfectamyl A 4692) was dispersed with stirring in 348 g of demineralizer water in a 1 L glass reactor with a cooling/heating jacket under a nitrogen atmosphere. The starch was dissolved by heating the mixture to 85° C. and cooking at 85° C. for 30 minutes. After starch dissolution was complete, 30.2 g of 0.66% strength aqueous solution of ferrous (II) sulfate heptahydrate was added in to the reactor. After 10 minutes 3.3 g of 30% strength hydrogen peroxide was added. After 10 minutes, the starch degradation was complete. Then 177.1 g of heated demineralizer water was added to the reactor. After the temperature had stabilized to 85° C., the chemical feeds were started. Monomers were fed in two steps: 106.3 g of tert-butyl acrylate was fed first during 72 minutes. 70.8 g of mixture of n-butyl acrylate and styrene (22:78 weight) in the first monomer feed and 106.3 g tert-butyl acrylate in the second monomer feed. The first feed was fed in 48 minutes and the second in 72 minutes. 48.8 g of 10% solution of hydrogen peroxide was fed simultaneously with the monomer feeds during 120 min. The reactor temperature was kept at 85° C. during the feeds and 15 minutes after for postpolymerization. Then the mixture was cooled to 60° C. and 5.5 g of 11.7% strength tert-butyl hydroperoxide solution was added dropwise into the reactor. The temperature was kept at 60° C. for further 60 min. Thereafter, cooling was effected to 40° C. and 6.2 g of 10% strength ethylenediaminetetraacetic acid sodium salt (EDTA-Na) solution was added, followed by pH adjustment to 6 with 25% strength sodium hydroxide solution and cooling to room temperature. Filtration was performed using a 100 µm filter cloth. A finely divided dispersion with a solids content of 26.5% is obtained.

Example 6

60.6 g of an oxidatively degraded potato starch (Perfectamyl A 4692) was dispersed with stirring in 348 g of demineralizer water in a 1 L glass reactor with a cooling/heating jacket under a nitrogen atmosphere. The starch was dissolved by heating the mixture to 85° C. and cooking at 85° C. for 30 minutes. After starch dissolution was complete, 30.2 g of 0.66% strength aqueous solution of ferrous (II) sulfate heptahydrate was added in to the reactor. After 10 minutes 3.5 g of 30% strength hydrogen peroxide was added. After 10 minutes, the starch degradation was complete. Then 177.1 g of heated demineralizer water was added to the reactor. After the temperature had stabilized to 85° C., the chemical feeds were started. Monomers were fed in two steps: 35.4 g of tert-butyl acrylate was fed first during 24 minutes. Then 141.7 g of mixture of n-butyl acrylate and styrene (1:3 weight) was fed during 96 minutes. 51.6 g of 10% solution of hydrogen peroxide was fed simultaneously with the monomer feeds during 120 min. The reactor temperature was kept at 85° C. during the feeds and 15 minutes after for postpolymerization. Then the mixture was cooled to 60° C. and 5.5 g of 11.7% strength tert-butyl hydroperoxide solution was added dropwise into the reactor. The temperature was kept at 60° C. for further 60 min. Thereafter, cooling was effected to 40° C. and 6.2 g of 10% strength ethylenediaminetetraacetic acid sodium salt (EDTA-Na)

solution was added, followed by pH adjustment to 6 with 25% strength sodium hydroxide solution and cooling to room temperature. Filtration was performed using a 100 μm filter cloth. A finely divided dispersion with a solid content of 26.5% is obtained.

Example 7

60.6 g of an oxidatively degraded potato starch (Perfectamyl A 4692) was dispersed with stirring in 348 g of demineralizer water in a 1 L glass reactor with a cooling/heating jacket under a nitrogen atmosphere. The starch was dissolved by heating the mixture to 85° C. and cooking at 85° C. for 30 minutes. After starch dissolution was complete, 30.2 g of 0.66% strength aqueous solution of ferrous (II) sulfate heptahydrate was added in to the reactor. After 10 minutes 3.3 g of 30% strength hydrogen peroxide was added. After 10 minutes, the starch degradation was complete. Then 177.1 g of heated demineralizer water was added to the reactor. After the temperature had stabilized to 85° C., the chemical feeds were started. Monomers were fed in two steps: 106.3 g of tert-butyl acrylate was fed first during 72 minutes. Then 70.8 g of mixture of n-butyl acrylate and styrene (1:2 weight) was fed during 48 minutes. 48.8 g of 10% solution of hydrogen peroxide was fed simultaneously with the monomer feeds during 120 min. The reactor temperature was kept at 85° C. during the feeds and 15 minutes after for postpolymerization. Then the mixture was cooled to 60° C. and 5.5 g of 11.7% strength tert-butyl hydroperoxide solution was added dropwise into the reactor. The temperature was kept at 60° C. for further 60 min. Thereafter, cooling was effected to 40° C. and 6.2 g of 10% strength ethylenediaminetetraacetic acid sodium salt (EDTA-Na) solution was added, followed by pH adjustment to 6 with 25% strength sodium hydroxide solution and cooling to room temperature. Filtration was performed using a 100 μm filter cloth. A finely divided dispersion with a solid content of 25.9% is obtained.

Comparative Example 1 (CE1)

57.25 g of an oxidatively degraded potato starch (Perfectamyl A 4692) was dispersed with stirring in 329 g of demineralizer water in a 1 L glass reactor with a cooling/heating jacket under a nitrogen atmosphere. The starch was dissolved by heating the mixture to 85° C. and cooking at 85° C. for 30 minutes. After starch dissolution was complete, 28.6 g of 0.66% strength aqueous solution of ferrous (II) sulfate heptahydrate was added in to the reactor. After 10 minutes 3.3 g of 30% strength hydrogen peroxide was added. After 10 minutes, the starch degradation was complete. Then 167.4 g of heated demineralizer water was added to the reactor. After the temperature had stabilized to 85° C., the chemical feeds were started. 167.5 g of a mixture of n-butyl acrylate and tert-butyl acrylate (1:3 weight) was fed during 120 minutes. 48.8 g of 10% solution of hydrogen peroxide was fed simultaneously with the monomer feed during 120 min. The reactor temperature was kept at 85° C. during the feeds and 15 minutes after for postpolymerization. Then the mixture was cooled to 60° C. and 5.2 g of 16.7% strength tert-butyl hydroperoxide solution was added dropwise into the reactor. The temperature was kept at 60° C. for further 60 min. Thereafter, cooling was effected to 40° C. and 5.9 g of 10% strength ethylenediaminetetraacetic acid sodium salt (EDTA-Na) solution was added, followed by pH adjustment to 6 with 25% strength sodium hydroxide solution and cooling to room temperature. Filtration was performed using a 100 μm filter cloth. A finely divided dispersion with a solid content of 26.8% is obtained.

TEST EXAMPLES

A series of surface sizes and formulates were tested for the surface size application using an internally unsized, recycled fiber linerboards with base weight of ca. 120 and 100 g/m². Mathis size presses were used in these tests. The surface size was added to surface size starch (C*film 07311) solution at 15% reference to base weight 120 g/m² or test series example number 1 and 18% solids content reference to base weight 100 g/m² or test series example number 2. Hydrophobic polymers were added at concentrations of 1.5, 3.0 and 4.5 weight-%. Sizing tests were carried out at 70° C. temperature. Temperature of the size press nip was measured with Reatec NO1 temperature indicator strips and temperature of the water bath for size press rolls was adjusted to obtain the desired temperature. The sheets were run through a horizontal pond size press at 2 m/min (2 Bar). The sheets were dried at 95° C. 1 min/side either using a contact dryer or a drum dryer. Temperature of the dryers was adjusted using Reatec NO82 temperature indicator strips. The sizing efficiency was determined by measuring Cobb60 sizing degree according to standard ISO 535:1991(E), at 23° C. and 50% relative humidity.

The particle sizes of the samples were measured using Zetasizer Nano-device. The glass transition temperatures of the samples were measured from freeze dried samples using a differential scanning calorimeter (DSC). The solids contents of the new surface sizes were measured using a Mettler Toledo Halogen moisture analyzer.

Figure 2:
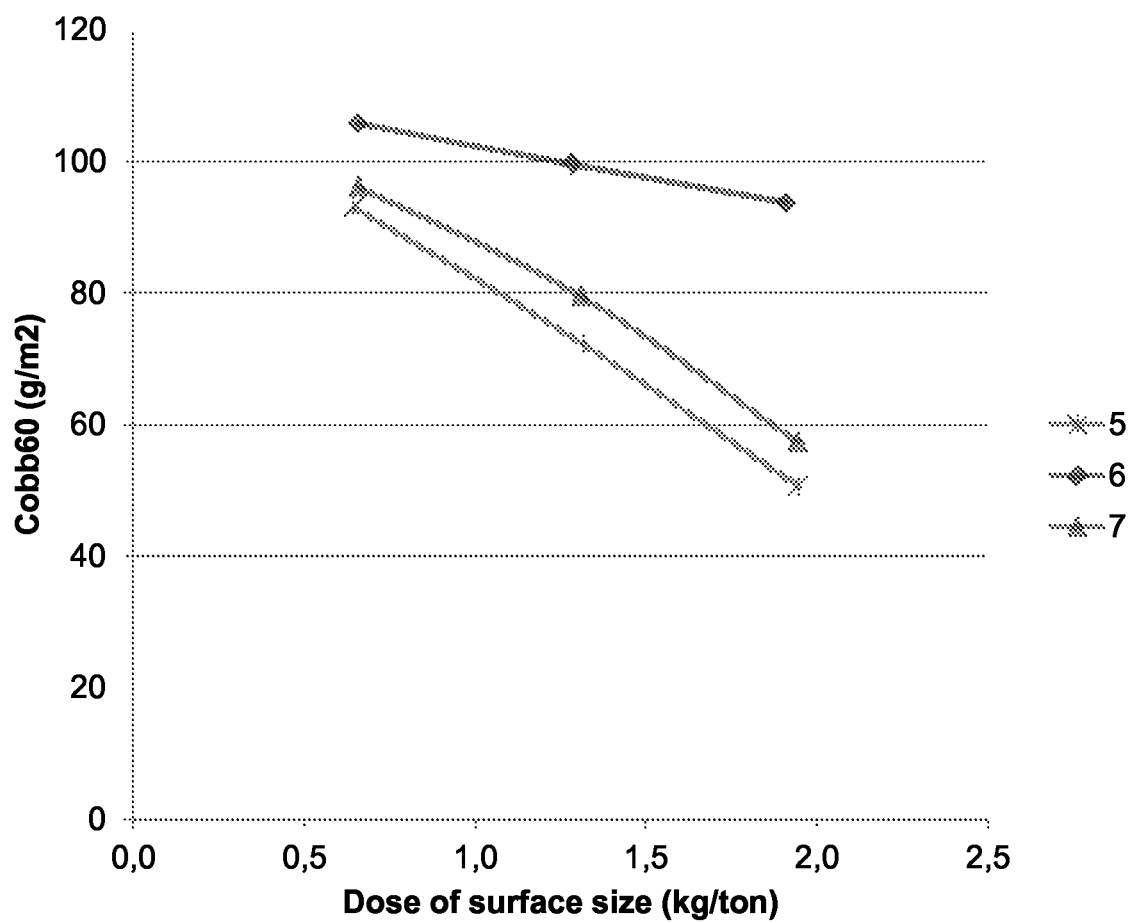
FIG. 2 shows water absorptiveness of paper surface sized with second batch of different sizing compositions.

The compositions of the tested sizes are shown in Table 1 and Table 2. FIGS. 1 and 2 show water absorptiveness of paper surface sized with the different sizing compositions. Of the tested monomer compositions comprising tert-butyl acrylate in the shell polymer gave the best results.

TABLE 1

Sizing tests with base liner number 1, basis weight of 120 g/m² and core-shell polymers CE1, 1, 2, 3 and 4.

| | | w-% of polymer* | | shell monomers w-% | core monomers w-% | | | Tg | PSD, nm |
|---|---|---|---|---|---|---|---|---|---|
| | | shell | core | t-BA | styrene | n-BA | ACN | °C. | D50 |
| CE1 | | | | | | | | 20 | 72 |
| 1 | Step feed | 50 | 50 | 50 | | 25 | 25 | 45 | 103 |
| 2 | Step feed | 50 | 50 | 50 | 25 | 25 | | 24/44 | 49 |
| 3 | Step feed | 75 | 25 | 75 | | 25 | | 46 | 67 |
| 4 | Grad. feed | 75 | 25 | 75 | | 25 | | 30 | 71 |

*excluding starch

TABLE 2

Sizing tests with base liner number 2, basis weight of 100 g/m² and core-shell polymers 5, 6, and 7.

| Ex no | w-% of polymer* | | shell monomers w-% | | | core monomers w-% | | | Tg °C | PSD, nm D50 |
|---|---|---|---|---|---|---|---|---|---|---|
| | shell | core | styrene | n-BA | t-BA | styrene | n-BA | t-BA | | |
| 5 | 60 | 40 | — | — | 60 | 31 | 9 | — | 52 | 62 |
| 6 | 80 | 20 | 60 | 20 | — | — | — | 20 | 63 | 74 |
| 7 | 40 | 60 | 30 | 10 | — | — | — | 60 | 51/62 | 69 |

*excluding starch

It will be obvious to a person skilled in the art that, as the technology advances, the inventive concept can be implemented in various ways. The invention and its embodiments are not limited to the examples described above but may vary within the scope of the claims.

The invention claimed is:

1. A core/shell polymer particle for surface sizing of cellulosic products,
   wherein the core polymer and the shell polymer of the core/shell polymer particle are polymerized from monomers comprising one or more selected from tert-butyl acrylate, n-butyl acrylate, and acrylonitrile;
   provided that the polymer of the core/shell polymer particle comprises at least 40% by weight of tert-butyl acrylate and at least 50% by combined weight of at least one of tert-butyl acrylate, n-butyl acrylate, and acrylonitrile, based on the total weight of the monomers of the core/shell polymer particle;
   wherein the core/shell polymer comprises:
   (a) a core polymer polymerized from monomers comprising at least 25% by weight, of monomers selected from tert-butyl acrylate, n-butyl acrylate, and acrylonitrile; and
   (b) a shell polymer polymerized from monomers comprising at least 25% by weight, of tert-butyl acrylate, based on total weight of the monomers of the core/shell polymer particle, and wherein the shell polymer encapsulates the core polymer; and
   wherein 10 to 60 wt % of the core/shell polymer particle is degraded starch with a molecular weight $M_n$ of 500 to 10,000.

2. The core/shell polymer particle as claimed in claim 1, wherein the core/shell polymer comprises at least 50% by weight branched $C_{3-10}$-alkyl (meth)acrylate and at least 75% by total weight, of branched $C_{3-6}$-alkyl acrylate and acrylonitrile, based on the total weight of the monomers of the core/shell polymer particle.

3. The core/shell polymer particle as claimed claim 1, wherein the core/shell polymer comprises at least 60% by weight, of branched $C_{3-10}$-alkyl (meth)acrylate based on the total weight of the monomers of the core/shell polymer particle.

4. The core/shell polymer particle as claimed in claim 1, wherein the shell polymer comprises at least 50% by weight of branched $C_{3-10}$-alkyl (meth)acrylate, based on the total weight of the shell polymer monomers.

5. The core/shell polymer particle as claimed in claim 1, wherein the core polymer comprises 50 to 100% by weight of monomers selected from branched $C_{3-10}$-alkyl (meth)acrylate, styrene, linear $C_{1-10}$-alkyl (meth)acrylate, and acrylonitrile, and any mixtures thereof, based on the total weight of the core polymer monomers.

6. The core/shell polymer particle as claimed in claim 5, wherein the branched $C_{3-10}$-alkyl (meth)acrylate is tert-butyl acrylate.

7. The core/shell polymer particle as claimed in claim 5, wherein the linear $C_{1-10}$-alkyl (meth)acrylate is n-butyl acrylate.

8. The core/shell polymer particle as claimed in claim 1, wherein the ratio of the weight of the core polymer monomers to the weight of the shell polymer monomers is preferably from 75:25 to 25:75.

9. The core/shell polymer particle as claimed in claim 1, wherein the shell polymer has a glass transition temperature from 35 to 75° C.

10. The core/shell polymer particle as claimed in claim 1, wherein the core polymer has a glass transition temperature below 75° C.

11. The core/shell polymer as claimed in claim 1, wherein the particle size distribution D50 of the core/shell polymer particle is below 110 nm.

12. The core/shell polymer particle as claimed in claim 1, wherein the core polymer and the shell polymer of the core/shell polymer particle are polymerized from monomers in presence of degraded starch or water-soluble natural or synthetic polymer.

13. A surface sizing composition comprising core-shell polymer as defined in claim 1.

14. The surface sizing composition as claimed in claim 13, wherein the starch is anionic starch.

15. A method of surface sizing a cellulosic product, comprising applying to at least one surface of the cellulosic product a sizing composition comprising core-shell polymer particles as defined in claim 14.

16. A surface-sized cellulosic product comprising the surface sizing composition as defined in claim 13.

17. A method of surface sizing a cellulosic product, comprising applying to at least one surface of the cellulosic product a surface sizing composition as defined in claim 13.

18. The method as claimed in claim 17, wherein the cellulosic product is paper.

19. A surface-sized cellulosic product comprising the core-shell polymer particles as defined in claim 1.

20. A method of surface sizing a cellulosic product, comprising applying to at least one surface of the cellulosic product a core-shell polymer as defined in claim 1.

21. The core/shell polymer particle as claimed in claim 1, wherein at least 80 wt % of the monomers are one or more monomers selected from the group consisting of tert-butyl (meth)acrylate, n-butyl (meth)acrylate, styrene and acrylonitrile.

* * * * *